(12) United States Patent
Sakata et al.

(10) Patent No.: US 6,940,706 B2
(45) Date of Patent: Sep. 6, 2005

(54) ELECTRODE MATERIAL AND CAPACITOR

(75) Inventors: Yusaku Sakata, Okayama (JP);
Akinori Muto, Okayama (JP);
Norimasa Yamada, Kurashiki (JP);
Azhar Uddin, Okayama (JP); Masaru
Takei, Hofu (JP); Kenji Kojima, Hofu
(JP); Satoshi Ibaraki, Hofu (JP);
Chisato Marumo, Hofu (JP)

(73) Assignee: Kanebo Ltd., Tokyo (JP)

( * ) Notice: Subject to any disclaimer, the term of this patent is extended or adjusted under 35 U.S.C. 154(b) by 53 days.

(21) Appl. No.: 10/296,109

(22) PCT Filed: Dec. 1, 2000

(86) PCT No.: PCT/JP00/08575

§ 371 (c)(1),
(2), (4) Date: Feb. 24, 2003

(87) PCT Pub. No.: WO01/93289

PCT Pub. Date: Dec. 6, 2001

(65) Prior Publication Data

US 2004/0004208 A1 Jan. 8, 2004

(30) Foreign Application Priority Data

May 31, 2000 (JP) ........................................ 2000-161653

(51) Int. Cl.[7] ............................................ H01G 4/005
(52) U.S. Cl. ...................... 361/303; 361/508; 423/44 R
(58) Field of Search ........................ 361/303, 502–504, 361/508–509, 512, 523, 528; 423/44 R (56) References Cited

FOREIGN PATENT DOCUMENTS

| EP | 660345 A1 | 6/1995 |
|---|---|---|
| EP | 0786786 A1 | 3/1997 |
| EP | WO 97/20333 | 6/1997 |
| JP | 61-102023 | 5/1986 |
| JP | 3-280415 | 12/1991 |
| JP | 4-294515 | 10/1992 |
| JP | 6-151246 | 5/1994 |
| JP | 7-161588 | 6/1995 |
| JP | 9-213589 | 8/1997 |
| JP | 10-106900 | * 4/1998 |
| JP | 10-172870 | 6/1998 |
| JP | 10-507881 | 7/1998 |
| JP | 2000-502209 | 2/2000 |
| WO | WO 97/07518 | 2/1997 |

OTHER PUBLICATIONS

PCT Search Report.
Akinori Muto et al., *Application to the Electric Double Layer Capacitor form the Ion–exchanged Resin*, 26th Academic Conference of the Carbon Society of Japan, Dec. 1–3, 1999.
N. Yamada et al., *The effect of metal composition on the charge–discharge behaviors of the carbon porous electric double layer capacitor*. 67th Academic Conference of the Electrochemical Society of Japan. Apr. 4–6, 2000.

* cited by examiner

Primary Examiner—Anthony Dinkins
(74) Attorney, Agent, or Firm—Morgan & Finnegan, LLP

(57) ABSTRACT

It is acknowledged that an electric double layer capacitor is markedly superior in power density and cycle characteristics to a secondary battery. However, a higher energy density is required to apply it to a power supply of hybrid vehicle, electric vehicle or the like. The present inventors have found that a carbonaceous material containing copper or a compound of copper exhibits excellent characteristics as an electrode material for capacitor and can realize a capacitor having a large capacity. In the electrode material and the capacitor, copper or a compound of copper exists in the amount of 0.8 to 30 parts by weight calculated on the metal basis based on 100 parts by weight of the carbonaceous material, particularly preferably.

13 Claims, 4 Drawing Sheets

ELECTRODE MATERIAL AND CAPACITOR

This application is the national stage in the United States of PCT international application No. PCT/JP00/08575, filed Dec. 1, 2000, which claims benefit of Japanese patent application 2000-161653, filed May 31, 2000.

TECHNICAL FIELD

The present invention relates to an electrode material and a capacitor, which are excellent in high capacity and heavy current charge/discharge characteristics and cycle characteristics.

BACKGROUND ART

Recently, demands of a capacitor using an electrode material made of active carbon as memory backup power supply, auxiliary power supply or the like have rapidly increased and the capacitor has attracted special interest with the development of the field of electronics. Also it has recently been required to perform further size reduction of the memory backup power supply and to develop a capacitor having a high energy density capable of performing heavy current charge/discharge in a moment at a high capacity used in applications such as solar backup energy storage device and power source adapted for vehicle.

A conventional capacitor can be roughly classified into two types according to a difference in charge storage mechanism. One is a so-called electric double layer capacitor utilizing an electric double layer capacity accumulated at the interface between an active carbon electrode and an electrolytic solution, while the other one is a redox capacitor utilizing an pseudo double layer developed by the redox reaction on the surface of an electrode made of a metal oxide.

It has been studied to use the electric double layer capacitor in applications such as power supply for driving motors of electric vehicle, hybrid vehicle or the like, and power supply of regenerative energy devices upon breaking because it has a high power density and high reliability to repeating of a charge/discharge cycle compared with a conventional secondary battery. As the electrode material, active carbon having a large specific surface area of about 1000 to 2000 $m^2/g$ has widely been used in view of chemical stability and high conductivity. It is considered that active carbon containing a large number of pores having a diameter of 2 nm or more is preferably used to perform heavy current charge/discharge because the thickness of the electric double layer is deemed to be about 1 nm.

Recently, a redox capacitor using an electrode made of a noble metal oxide of ruthenium, iridium or the like has been proposed to increase the capacity of the capacitor. The redox capacitor enable charges to accumulate due to adsorption/desorption of hydrogen ions to the metal oxide electrode. As the electrode material, a metal oxide or pi-conjugated conductive polymer, wherein valences vary with incoming and outgoing of d-electrons, is used.

However, the capacitor has not enough capacity and heavy current characteristics to use in applications such as energy storage device or power source adapted for vehicle and high capacity and high performances are required to both the electric double layer capacitor and the redox capacitor.

It is acknowledged that the electric double layer capacitor is markedly superior in power density and cycle characteristics to the secondary battery. However, a higher energy density is required in a power supply of hybrid vehicle, electric vehicle or the like.

The redox capacitor using a noble metal oxide of ruthenium, iridium or the like has advantages such as high energy density, small size and low internal resistance, and less danger of ignition as compared with the electric double layer capacitor. However, practical higher capacity is required when using in heavy current applications. Ruthenium and iridium are very expensive because of low production, and a drastic study is required in view of the manufacturing method, mass-producibility and cost.

DISCLOSURE OF THE INVENTION

The present inventors have intensively studied to solve the problems described above and completed the following invention as a means for solving the problems.

The electrode material comprising a carbonaceous material in which copper or a compound of copper exists, which is provided by the present invention, can realize a high-capacity capacitor. In the present invention, the electrode material, wherein the carbonaceous material has a maximum value of a pore size distribution at a pore diameter within a range of $X \pm \alpha$ nm ($3.0 \leq X < 10$, $\alpha = 1.0$: within a range of distribution of the pore diameter), is used particularly preferably. The carbonaceous material of the present invention is particularly preferably an ion-exchange resin carbide or a phenol rein carbide. As a method of allowing copper or a compound of copper to exist in the carbonaceous material, for example, a method of adding copper or the compound of copper to an electrolytic solution and applying an electric field can be employed.

The present invention provides the above electrode material and a high-capacity capacitor comprising two carbon electrodes made of the electrode material, an electrolytic solution and a separator as a main constituent element. Particularly, in case a main component of the electrolytic solution is sulfuric acid, excellent characteristics can be exhibited.

BEST MODE FOR CARRYING OUT THE INVENTION

In the carbonaceous material used as the electrode material of the present invention, the structure or chemical composition, for example, crystal structure, specific surface area, surface functional group, pore structure and carbon content are not specifically limited and, therefore, a starting material of the carbonaceous material is not specifically limited. For example, there can be preferably used resin carbide, coconut shell carbide, coke, sawdust carbide, charcoal, bamboo carbide, cork carbide, natural fiber carbide from cotton and the like. Also the resin used as a starting material of the resin carbide is not specifically limited and, for example, there can be preferably used ion-exchange resin, or thermosetting resin such as phenol resin, melamine resin, urea resin or furan resin. Particularly, an ion-exchange resin or a phenol resin can be preferably used.

The ion-exchange resin includes a cation-exchange resin and an anion-exchange resin. The cation-exchange resin is a polymer acid wherein an acidic hydroxyl group, or an acidic group such as carboxyl group, sulfone group or the like is combined with a ground synthetic resin, and can be preferably used for the following reason. That is, the ion-exchange resin can support a lot of transition metal ions while being sufficiently dispersed after ion exchange with the transition metal ions in the solution. Therefore, copper ions can be uniformly dispersed without causing drastic agglomeration. Among these, an aminophosphoric acid chelete resin is most preferred.

The phenol resin is preferably used in view of easy handling upon preparation, high carbonization yield and easy control of pores, and the following granular phenol resin is most preferred.

The granular phenol resin is disclosed in Japanese Examined Patent Publication (Kokoku) No. 62-30210 or Japanese Examined Patent Publication (Kokoku) No. 62-30212 and is a granular resin containing a condensate of phenols and an aldehyde as a main component, and a particularly preferred granular phenol resin is a granular phenol resin containing (A) spherical primary particles having a particle diameter of 0.1 to 150 µm and a secondary agglomerate thereof, wherein (B) particles having a size capable of passing through a sieve having a mesh size of 150 µm accounts for at least 50% by weight of entire particles and (C) the solubility in methanol defined in the specification is 50% by weight or less and, moreover, (D) the free phenol content as measured by liquid chromatography is 100 ppm or less.

Although the structure and chemical composition of the carbonaceous material in the present invention are not specifically limited, a carbonaceous material having a specific pore size distribution is particularly preferred because it can rabidly adsorb and desorb electrolyte ions and exhibit high adsorption capacity to them.

The carbonaceous material having a maximum value of a pore size distribution at a pore diameter within a range of $X \pm \alpha$ nm ($3.0 \leq X < 10$, $\alpha = 1.0$: within a range of distribution of the pore diameter) is markedly excellent as the electrode material for capacity of the present invention.

The pore diameter $X \pm \alpha$ nm ($3.0 \leq X < 10$, $\alpha = 1.0$: within a range of distribution of the pore diameter) of the carbonaceous material of the present invention is not specifically limited, but usually accounts for 15% or more, preferably 20 to 95%, and more preferably 30 to 95%, of entire mesopore volume of pores having a pore diameter within a range from 2.0 to 5 nm.

Copper or a compound of copper exists in the carbonaceous material used in the electrode material and the capacitor of the present invention, and copper or a compound of copper preferably exists in the amount calculated on the metal basis of 0.8 to 30 parts by weight based on 100 parts of the carbonaceous material. As used herein, "calculated on the metal basis" means that the weight of the compound is converted into the weight of copper alone by means of a ratio of the molecular weight of the compound to that of copper. Examples of the compound of copper include, but are not limited to, copper sulfate, copper chloride, copper nitrate or hydrates thereof, or copper compound combined with other atoms, cluster-like copper-containing metal and metallic compound. In the electrolytic solution, it exists in the form of copper ions, sometimes.

Although a function to be fulfilled by copper or a compound of copper in charge/discharge of the capacitor using the electrode material is not sufficiently elucidated, it is guessed that not only accumulation of electric energy due to a conventional simple electric double layer, but also an electrochemical redox reaction of copper and the compound of copper takes part in the function in the capacitor of the present invention.

Copper or a compound of copper may be incorporated before or after the heat treatment.

The method of allowing copper or a compound of copper to exist in the carbonaceous material includes, for example, a method of adding excess copper or a compound of copper to a carbonaceous material or a starting material thereof, performing acid cleaning using dilute hydrochloric acid or dilute nitric acid and controlling the degree of acid cleaning, thereby to control the amount of copper or a compound of copper to a predetermined amount, or a method of adding copper or a compound of copper, the amount of which was previously controlled to a predetermined amount calculated on the metal basis, followed by mixing. Copper or a compound of copper in the solid state may be uniformly mixed with the starting material or carbonaceous material, or copper or a compound of copper in the solution state may be uniformly mixed.

The carbonaceous material containing copper can be obtained by subjected to a heat treatment after incorporating copper or a compound of copper into the starting material. It is also possible to allow copper or a compound of copper to exist in the carbonaceous material by previously manufacture a capacitor using a carbonaceous material containing no copper as an electrode, adding a predetermined amount of copper or a compound of copper to an electrolytic solution and applying to an electric field.

The capacitor of the present invention comprises two carbon electrodes made of the electrode material, an electrolytic solution and a separator as a main constituent element.

Figure 1:
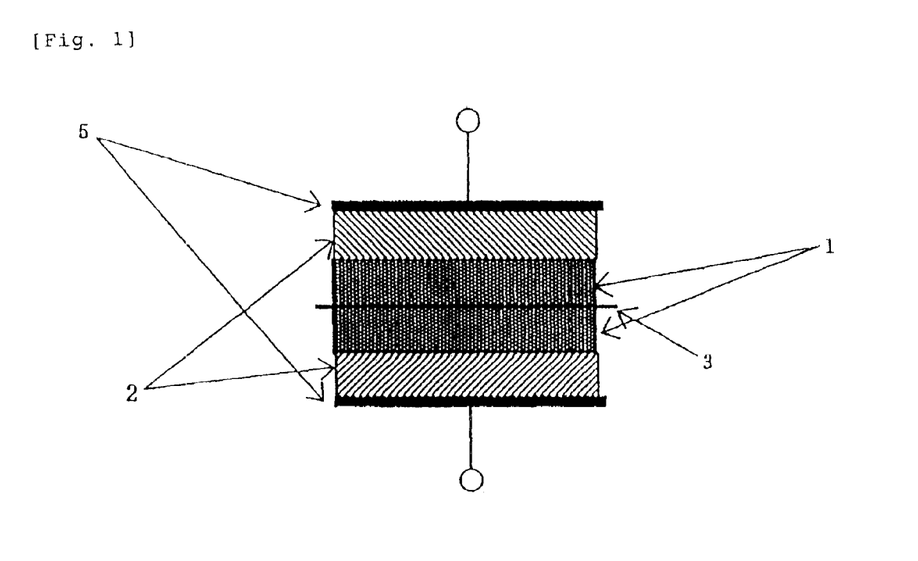
FIG. 1 is a schematic view showing an example of the construction of a capacitor, in which the reference symbol 1 denotes an electrode material containing an electrolytic solution, 2 denotes a current collector, 3 denotes a separator and 5 denotes a terminal board.

As shown in FIG. 1, the capacitor of the present invention is basically composed of an electrode material 1 containing an electrolytic solution and a current collector 2, which constitute a unit polarizable electrode, and a separator 3 disposed between two polarizable electrode. If necessary, these constituent units can be laminated in parallel or series.

When using the electrode material of the present invention in the capacitor, it is used in the form of slurry containing the electrolytic solution. Examples of the form include, but are not limited to, formed body obtained by forming using a fluorine resin binder such as polytetrafluoroethylene or a hydrophilic binder such as carboxymethyl cellulose, polyvinyl alcohol or the like, plate-like formed body obtained by forming using a thermosetting resin, and a formed body obtained by heat-treating the plate-like formed body.

An aqueous solution of sulfuric acid, hydrochloric acid or the like is usually used as the aqueous electrolytic solution, and an electrolytic solution containing sulfuric acid as a main component is used as the electrolytic solution in the present invention, particularly preferably. However, the kind and concentration of an electrolyte of the electrolytic solution are not specifically limited. Also in case the electrolytic solution contains a secondary component for controlling the conductivity, viscosity, voltage endurance or the like of the electrolytic solution, the kind and concentration of the secondary component are not specifically limited.

EXAMPLES (Measuring Procedures)

Usually, the method of measuring pores of porous materials such as carbon and ceramics includes various gas adsorption methods and mercury penetration methods and an optimum method is used according to the size of pores. Although the measuring method and the analytical method will be described in detail hereinafter, the pore volume having a pore diameter X±α nm (within a range of distribution of the pore diameter) within a range from about 0.7 to 50 nm is usually analyzed by a nitrogen adsorption method at a liquid nitrogen temperature.

The pore size distribution and pore volume ($V_0$, $V_1$) of an electrode material were measured by the nitrogen adsorption method at a liquid nitrogen temperature using a full automatic gas adsorption measuring apparatus BElSORP28 (manufactured by Nippon Bell, Ltd.). The pore volume of pores having a pore diameter of 2.0 to 50 nm was determined by a Dollimore-Heal method. This is a method of calculating a pore size distribution employing a desorption isotherm, assuming that the shapes of pores are cylindrical.

In the determination of copper or a compound of copper in the carbonaceous material, an ICP emission spectrometry was used.

An outline of the determination will be given hereinafter.

(1) Measurement of Pore Size Distribution and Pore Volume

A pore radius of cylindrical pores is expressed by the equation (1).

$$r_P = t + r_k \qquad (1)$$

where $r_P$: pore radius $r_k$: core radius of meniscus portion t: thickness of adsorption layer at pressure P Twice the pore radius $r_P$ is taken as a pore diameter.

The thickness of the adsorption layer is determined from t-plots of a standard sample, while the core radius is determined from the Kelvin equation (2).

$$ln(p/p_0) = -(2\gamma V_L/r_m RT)\cos\theta \qquad (2)$$

where p: equilibrium pressure $p_0$: saturated vapor pressure

γ: surface tension of liquid $V_L$: molar volume of liquid $r_m$: meniscus radius R: gas constant T: measuring temperature θ: contact angle between liquid and pores Assuming that the meniscus radius upon desorption is equal to the core radius, in case of nitrogen at a liquid temperature temperature, the following equation is given.

$$r_k(nm) = 0.4078/\log(p_0/p) \qquad (3)$$

The pore size distribution and pore volume of pores having a pore diameter of 2.0 to 50 nm were determined in the procedures described above.

(2) Measurement of Capacity

A capacity of each of capacitors manufactured in the Examples was measured in the following manner. In a thermohygrostat at 30° C. and 80%, the capacitor was charged at a constant voltage for 6 hours by applying 0.9 V between both electrodes of the capacitor and discharged at a constant current of 100 μA, and then the capacity of the capacitor was determined from the time required to reduce the voltage from 0.54 V to 0.45 V. The capacity per unit weight of the electrode material was determined from the resulting capacity of the capacitor and the weight of a pair of polarizable electrodes.

(3) Measurement of Content of Copper or a Compound of Copper

The content of copper or a compound of copper in each of carbonaceous materials prepared in the Examples was measured in the following manner. 1.0 g of the carbonaceous material was subjected to an ashing treatment and the resulting ash was completely dissolved with heating using an acid and concentrated to dryness. Then, the dry ash was dissolved again with heating using 1 ml of nitric acid and pure water and the solution was made to a fixed volume of 50 ml, which was taken as a sample solution. Using an ICP emission spectrophotometer, Model SPS1500VR (manufactured by SII Inc.), the copper content calculated on the metal basis of the test solution was determined from the measurement of the concentration of copper ions by a calibration curve method.

The present invention will now be described in detail by way of Examples, but the present invention is not limited to the following Examples.

Example 1

A carbonaceous material was prepared by adsorbing $Cu^{2+}$ in an ion-exchange resin used as a carbon material. Using an aminophosphoric acid chelete resin (C467, manufactured by Sumitomo Chemical Industries Co., Ltd.) as the ion-exchange resin, $Cu^{2+}$ was adsorbed in the resin by passing a three-fold amount (based on an ion-exchange capacity) of a 0.5 M aqueous Copper(II)Chloride solution through a column using a column flow contact method.

The resulting carbonaceous material was washed with water, dried at 110° C. for 12 hours, and then ashed by heating from room temperature to 800° C. at a rate of 5° C./min in an $N^2$ atmosphere using an electric oven and allowing to stand at the same temperature for 3 hours. Furthermore, the resulting carbide was refluxed with a 5M hydrochloric acid, thereby to elute copper, and then hydrochloric acid and copper ions were removed from the carbide by boiling in deionized water.

The degree of the heat treatment was changed to obtain seven kinds of carbonaceous materials each having a Cu content calculated on the metal basis of 0.0018 parts by weight (carbonaceous material 1), 0.09 parts by weight (carbonaceous material 2), 0.79 parts by weight (carbonaceous material 3), 1.4 parts by weight (carbonaceous material 4), 18 parts by weight (carbonaceous material 5), 27 parts by weight (carbonaceous material 6) or 34 parts by weight (carbonaceous material 7) based on 100 parts by weight of the ion-exchange resin carbide.

Example 2

Figure 2:
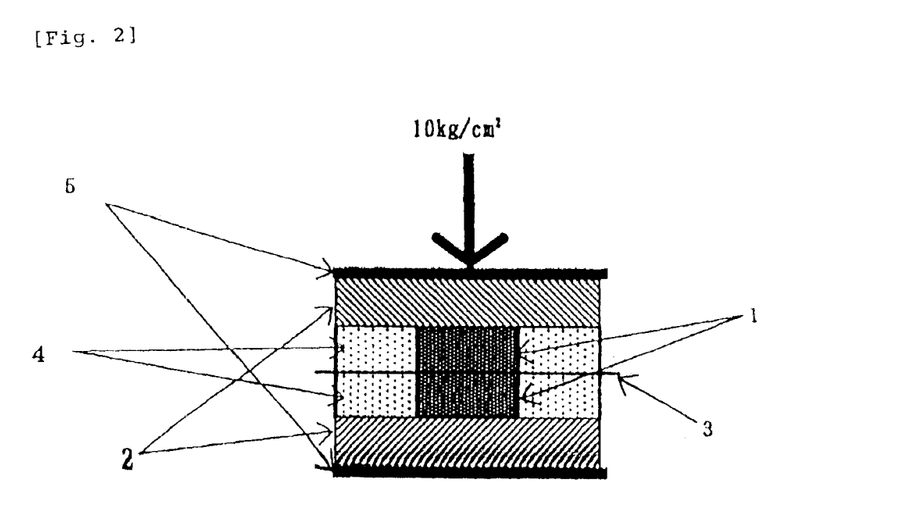
FIG. 2 is a schematic view showing an example of the construction of a capacitor using a slurry-like electrode material supporting Cu of the present invention, in which the reference symbol 1 denotes an electrode material containing an electrolytic solution, 2 denotes a current collector, 3 denotes a separator, 4 denotes a spacer and 5 denotes a terminal board.

Seven kinds of capacitors using the carbonaceous materials prepared in Example 1 as the electrode material were manufactured. FIG. 2 shows a structure of a cross section of the capacitor thus manufactured.

The carbonaceous material of Example 1 was mixed with an aqueous 30 wt % sulfuric acid solution used as the electrolytic solution, thereby to impregnate the carbonaceous material with the solution to manufacture an electrode material 1 containing a slurry-like electrolytic solution.

Using a disk-shaped platinum plate having a thickness of 1 mm and an outer diameter of 18 mm as a current collector 2, a disk-shaped silicone rubber having a thickness of 0.5 mm, an inner diameter of 3 mm and an outer diameter-of 18 mm used as a spacer 4 was contact-bonded on the current collector 2 and the slurry-like electrode material 1 containing sulfuric acid was filled into a hole having a depth of 0.5 mm and an inner diameter of 3 mm made of the platinum plate and the silicone rubber to obtain a polarizable electrode. After preparing two polarizable electrodes as for each electrode material 1, two polarizable electrodes were disposed oppositely by interposing a disk-shaped polypropylene separator 3 having a thickness of 25 μm and an outer diameter of 18 mm between them. Then, a terminal board 5 made of stainless steel was contact-bonded on both surfaces of the current collector 2. Furthermore, 10 kg of a load was applied on the terminal board 5 made of stainless steel to fix it.

Figure 3:
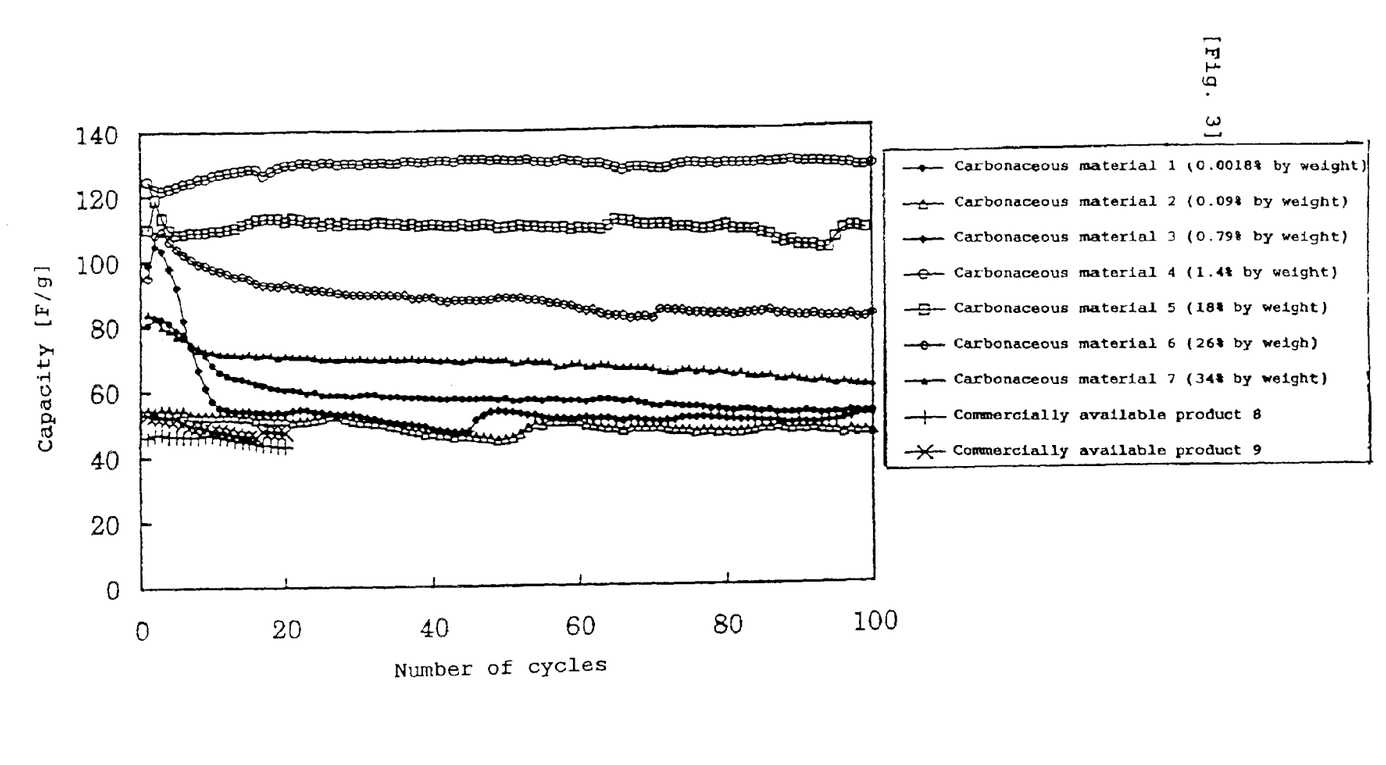
FIG. 3 is a graph showing a capacity and cycle characteristics of capacitors using carbonaceous materials 1 to 7 in the present invention.

With respect to seven kinds of capacitors thus obtained, 100 charge/discharge cycles were repeated and the capacity was measured. In the same manner as described above, except that a commercially available product 8 (ABK11-02, manufactured by Kanebo, Ltd.) and a commercially available product 9 (BGF15-1, manufactured by Kanebo, Ltd.) were used, capacitors of Comparative Examples were manufactured and the measurement was carried out. These results are shown in FIG. 3. Also a relationship between the capacity upon 100 cycles and the Cu content is shown in FIG. 4.

Figure 4:
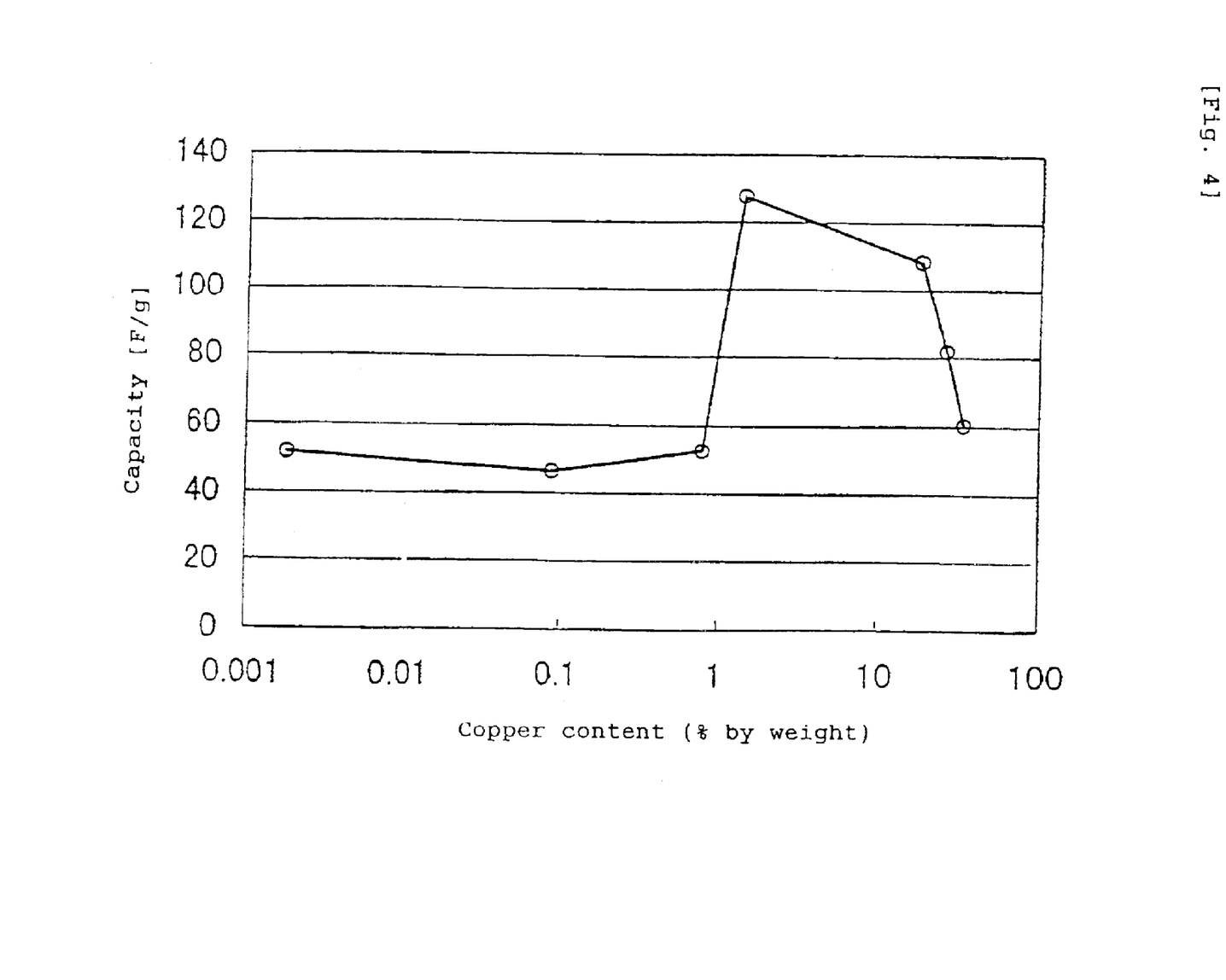
FIG. 4 is a graph showing a relationship between the capacity and the copper content of capacitors using carbonaceous materials 1 to 7 in the present invention.

As is apparent from FIG. 3 and FIG. 4, the capacity drastically varies depending on the Cu content. With respect to the capacitors using the carbonaceous materials 4, 5 and 6 each having a Cu content of 1.4%, 18% or 26%, the capacity markedly increased by two or more times as compared with the commercially available products 8 and 9 which do not support Cu. Among these capacitors, the capacitor using the carbonaceous material 4 stably exhibited a high capacity even if 100 charge/discharge cycles are repeated.

Therefore, these carbonaceous materials 4, 5 and 6 are electrode materials suited to achieve a high capacity and capacitors using them exhibit a high capacity and are markedly excellent.

The capacitors using the carbonaceous materials 1, 2, 3 and 7 each having a Cu content of 0.0018%, 0.09%, 0.79% and 34% exhibited the same capacity as that in case of using the commercially available products 8 and 9 which do not support Cu, and a large improvement in capacity was not achieved.

Example 3

With respect to the carbonaceous materials 1 to 7 of Example 1, the pore size distribution and the pore volume were measured. These results are shown in Table 1. The pore volume of pores having a pore diameter $X \pm \alpha$ nm ($3.0 \leq X < 10$, $\alpha = 1.0$: within a range of distribution of the pore diameter) is taken as $V_1$, while entire mesopore pore volume of pores having a pore diameter of 2.0 to 50 nm is taken as $V_0$. Hereinafter, a ratio of the pore volume ($V_1$) of pores having a pore diameter $X \pm \alpha$ nm ($3.0 \leq X < 10$, $\alpha = 1.0$: within a range of distribution of the pore diameter) to the pore volume ($V_0$) of pores having a pore diameter of 2.0 to 50 nm is expressed by $V_1/V_0$ (%).

TABLE 1

| Samples | Cu content (parts by weight) | Pore diameter at maximum value of pore size distribution (nm) | Pore volume $V_1$ of pores having a pore diameter $X \pm 1.0$ nm (cm³/g) | Entire mesopore volume $V_0$ of pores having a pore diameter of 2.0 to 50 nm (cm³/g) | $V_1/V_0$ (%) |
|---|---|---|---|---|---|
| Carbonaceous material 1 | 0.0018 | 3.8 | 0.039 | 0.146 | 26.7 |
| Carbonaceous material 2 | 0.09 | 3.8 | 0.071 | 0.153 | 46.4 |
| Carbonaceous material 3 | 0.79 | 3.9 | 0.067 | 0.124 | 54.0 |
| Carbonaceous material 4 | 1.4 | 3.6 | 0.035 | 0.074 | 47.3 |
| Carbonaceous material 5 | 18 | 3.6 | 0.101 | 0.209 | 48.3 |
| Carbonaceous material 6 | 26 | 3.6 | 0.048 | 0.097 | 49.5 |
| Carbonaceous material 7 | 34 | 4.1 | 0.031 | 0.071 | 43.7 |

X: pore diameter $3.0 \leq X < 10$
$V_1$: pore volume of pores having a pore diameter $X \pm 1.0$ nm
$V_0$: entire mesopore volume of pores having a pore diameter of 2.0 to 50 nm As is apparent from Table 1, the carbonaceous materials 1 to 7 have a maximum value of a pore size distribution at a pore to 7 have a maximum value of a pore size distribution at a pore diameter within a range of X±α nm (3.0≦X<10, α=1.0: within a range of distribution of the pore diameter) and are within the scope of the present invention. It is also apparent that the pore volume within the above range accounts for 15% or more of entire mesopore pore volume of pores having a pore diameter of 2.0 to 50 nm.

Example 4

A carbonaceous material was prepared by adsorbing $Cu^{2+}$ in a phenol resin used as a carbon material. Using a granular phenol resin having an average particle diameter of 20 μm (Bellpearl R800, manufactured by Kanebo, Ltd.) as the phenol resin, a 0.5 M aqueous copper chloride solution having a concentration, which achieves a predetermined amount calculated on the metallic Cu basis, was added, followed by sufficient mixing in a mixer and further drying in atmospheric air at 10° C. for 24 hours.

The dried sample was heat-treated by heating to 800° C. at a rate of 5° C./min in a nitrogen gas atmosphere using an electric oven and allowing to stand at the same temperature for 3 hours. Furthermore, the resulting carbide was refluxed with a 5M hydrochloric acid, thereby to elute copper, and then hydrochloric acid and copper ions were removed from the carbide by boiling in deionized water. The degree of the heat treatment was changed to obtain carbonaceous materials each having a Cu content calculated on the metal basis of 0.050 parts by weight (carbonaceous material 10), 1.5 parts by weight (carbonaceous material 11), 12.3 parts by weight (carbonaceous material 12) or 40 parts by weight (carbonaceous material 13) based on 100 parts by weight of the phenol resin carbide.

Example 5

A capacitor using the carbonaceous material prepared in Example 4, as the electrode material, in a carbon electrode was manufactured in the same manner as in Example 2. In the same manner as in Example 2 and Example 3, the capacity, the pore size distribution and the pore volume were measured. The measurement results of the capacity are shown in FIG. 5, while the measurement results of the pore size distribution and the pore volume are shown in Table 2.

Figure 5:
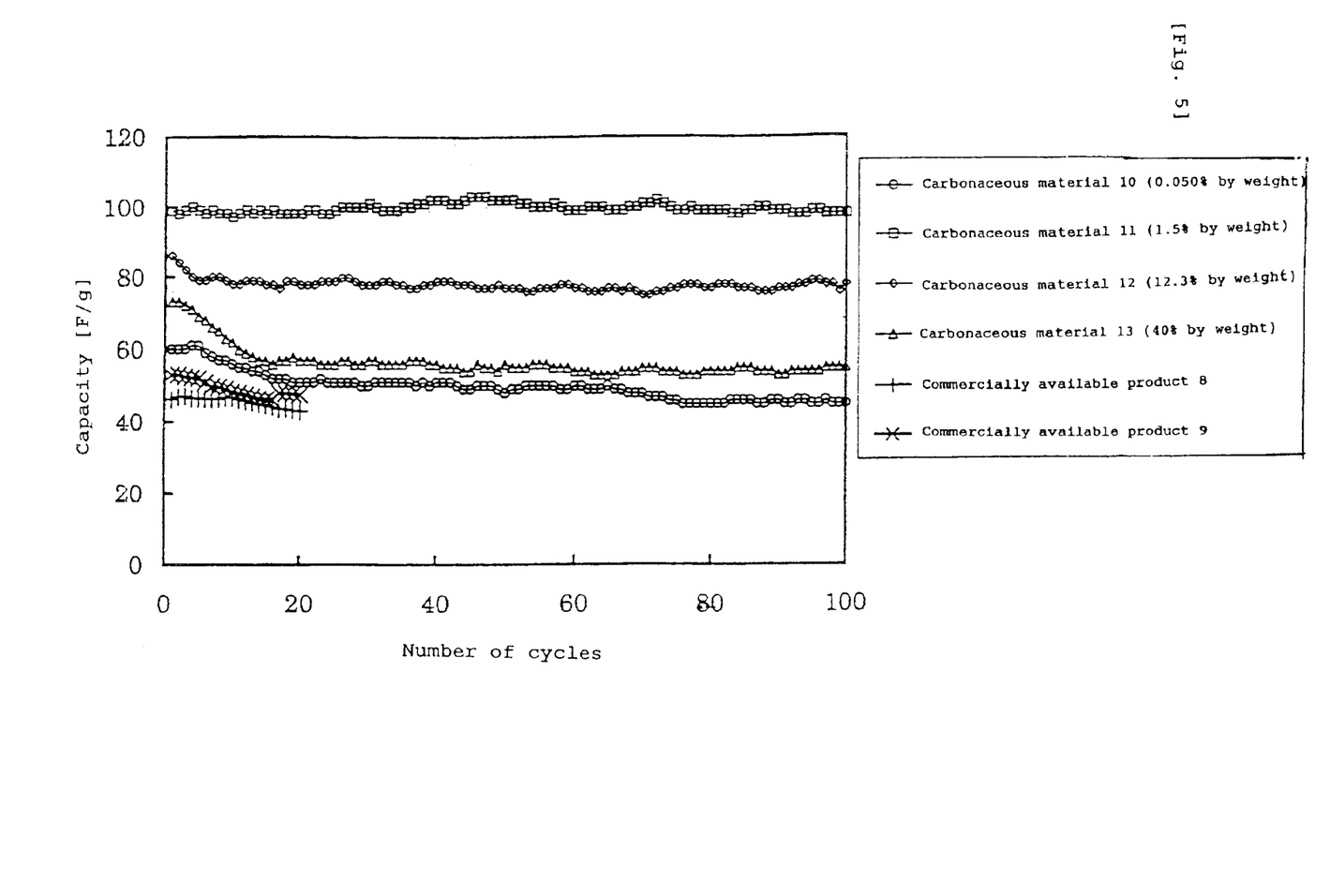
FIG. 5 is a graph showing a relationship between the capacity and the cycle characteristics of capacitors using carbonaceous materials 10 to 13 in the present invention.

As is apparent from FIG. 5, the capacity of the capacitors using the carbonaceous materials 11 and 12 each having a Cu content of 1.5 or 12.3 parts by weight was markedly improved as compared with the commercially available products 8 and 9 which do not support Cu. With respect to the capacitors using the carbonaceous materials 10 and 13 each having a Cu content of 0.050 or 40 parts by weight, a large improvement in capacity was not achieved.

As is apparent from Table 2, the carbonaceous materials 10 to 13 have a maximum value of a pore size distribution at a pore diameter within a range of X±α nm (3.0≦X<10, α=1.0: within a range of distribution of the pore diameter) and are within the scope of the present invention. It is also apparent that the pore volume within the above range accounts for 15% or more of entire mesopore pore volume of pores having a pore diameter of 2.0 to 50 nm.

Accordingly, the carbonaceous material using the phenol resin also exhibited the same results as in case of the ion-exchange resin. Particularly, the carbonaceous materials 11 and 12 are electrode materials suited to achieve a high capacity and the capacitors using the same exhibit a high capacity and are markedly excellent.

INDUSTRIAL APPLICABILITY

Since copper or a compound of copper exists in a carbonaceous material in the electrode material and capacitor of the present invention, a capacity increased by two or more times as compared with the prior art, and thus a high capacity can be reproduced in a very stable manner even if 100 charge/discharge cycles are repeated.

In case the carbonaceous material has a maximum value of a pore size distribution at a pore diameter within a range of X±α nm (3.0≦X<10, α=1.0: within a range of distribution of the pore diameter), it is made possible to realize a high energy density capable of performing heavy current charge/discharge in a moment. Consequently, the electrode material and capacitor of the present invention can be used in applications such as solar backup storage device and power source adapted for vehicle, particularly preferably, in addition to conventional applications such as electric double layer capacitor.

What is claimed is:

1. An electrode material comprising a carbonaceous material in which copper or a compound of copper exists.

2. The electrode material according to claim 1, wherein the pore size distribution of the carbonaceous material has a maximum value at a pore diameter within a range of X+α nm, wherein 3.0≦X<10 and wherein α=1.0.

TABLE 2

| Samples | Cu content (parts by weight) | Pore diameter at maximum value of pore size distribution (nm) | Pore volume $V_1$ of pores having a pore diameter X ± 1.0 nm (cm³/g) | Entire mesopore volume $V_0$ of pores having a pore diameter of 2.0 to 50 nm (cm³/g) | $V_1/V_0$ (%) |
|---|---|---|---|---|---|
| Carbonaceous material 10 | 0.050 | 3.9 | 0.045 | 0.213 | 21.1 |
| Carbonaceous material 11 | 1.5 | 3.8 | 0.022 | 0.099 | 22.2 |
| Carbonaceous material 12 | 12.3 | 3.8 | 0.015 | 0.087 | 17.2 |
| Carbonaceous material 13 | 40 | 4.2 | 0.020 | 0.123 | 16.3 |

X: pore diameter 3.0 ≦ X < 10
$V_1$: pore volume of pores having a pore diameter X ± 1.0 nm
$V_0$: entire mesopore volume of pores having a pore diameter of 2.0 to 50 nm 3. The electrode material according to claim 1 or 2, wherein the carbonaceous material is an ion-exchange resin carbide or a phenol resin carbide.

4. The electrode material according to claim 1 or claim 2, wherein copper or the compound of copper is incorporated into the carbonaceous material by adding copper or the compound of copper in an electrolytic solution, and applying an electric field.

5. The electrode material according to claim 3, wherein copper or the compound of copper is incorporated into the carbonaceous material by adding copper or the compound of copper in an electrolytic solution, and applying an electric field.

6. A capacitor comprising two carbon electrodes made of the electrode material of army one of claims 1 to 2, an electrolytic solution, and a separator.

7. A capacitor comprising two carbon electrodes made of the electrode material of claims 3, an electrolytic solution, and a separator.

8. A capacitor comprising two carbon electrodes made of the electrode material of claim 4, an electrolytic solution, and a separator.

9. A capacitor comprising two carbon electrodes made of the electrode material of claim 5, an electrolytic solution, and a separator.

10. The capacitor according to claim 6, wherein a main component of the electrolytic solution is sulfuric acid.

11. The capacitor according to claim 7, wherein a main component of the electrolytic solution is sulfuric acid.

12. The capacitor according to claim 8, wherein a main component of the electrolytic solution is sulfuric acid.

13. The capacitor according to claim 9, wherein a main component of the electrolytic solution is sulfuric acid.

* * * * *